United States Patent [19]

Araki et al.

[11] Patent Number: 5,582,910

[45] Date of Patent: Dec. 10, 1996

[54] MAGNETIC RECORDING MEDIUM

[75] Inventors: Hiroaki Araki; Kenichi Masuyama; Kazuo Kato; Yasuyuki Tanaka; Toshihiko Miura, all of Kanagawa, Japan

[73] Assignee: Fuji Photo Film Co., Ltd., Kanagawa, Japan

[21] Appl. No.: 384,797

[22] Filed: Feb. 6, 1995

Related U.S. Application Data

[63] Continuation of Ser. No. 834,784, Feb. 13, 1992, abandoned.

[30] Foreign Application Priority Data

Feb. 18, 1991 [JP] Japan ................................ 3-023517
Mar. 13, 1991 [JP] Japan ................................ 3-048314

[51] Int. Cl.6 ........................... G11B 5/66; B32B 5/16
[52] U.S. Cl. ...................... 428/323; 428/328; 428/329; 428/331; 428/336; 428/408; 428/704; 428/694 B; 428/694 BC; 428/694 BG; 428/694 BR; 428/694 BA; 428/694 BM; 428/900
[58] Field of Search ................................ 428/323, 328, 428/329, 331, 336, 408, 704, 900, 694 B, 694 BC, 694 BG, 694 BR, 694 BA, 694 BM

[56] References Cited

U.S. PATENT DOCUMENTS

| | | | |
|---|---|---|---|
| 4,844,946 | 7/1989 | Komatsu | 427/549 |
| 4,851,289 | 7/1989 | Ogawa et al. | 428/329 |
| 4,992,330 | 2/1991 | Kawahara et al. | 428/329 |
| 5,001,006 | 3/1991 | Saito et al. | 428/323 |
| 5,035,856 | 7/1991 | Koyama et al. | 428/328 |
| 5,075,167 | 12/1991 | Yamauchi et al. | 428/336 |

FOREIGN PATENT DOCUMENTS

| | | | |
|---|---|---|---|
| 1199316 | 8/1989 | Japan | G11B 5/702 |
| 2206020 | 8/1990 | Japan | G11B 5/716 |

*Primary Examiner*—Leszek Kiliman
*Attorney, Agent, or Firm*—Sughrue, Mion, Zinn, Macpeak & Seas

[57] ABSTRACT

A magnetic recording medium having improved electromagnetic characteristics and running properties is disclosed. The magnetic recording medium comprises a non-magnetic support having thereon a plurality of magnetic layers consisting of two or more layers composed of a first lower magnetic layer and a second upper magnetic layer, provided on said support by either co-coating the lower magnetic layer and the upper magnetic layer in the wet state, or coating the lower magnetic layer and then the upper magnetic layer while the lower magnetic layer is still in the wet state; wherein the cobalt-modified iron oxide is employed as the ferromagnetic powder contained in the lower magnetic layer, ferromagnetic metal is employed as the ferromagnetic powder contained in the upper magnetic layer, both the ferromagnetic powder contained in the lower magnetic layer and the ferromagnetic powder contained in the upper magnetic layer having an average major axis length of 0.25 μm or less and an average acicular ratio of 10 or less, a difference in the average major axis length between the ferromagnetic powder contained in the lower magnetic layer and that contained in the upper magnetic layer of 0.08 μm or less, and a difference in the average acicular ratio between the ferromagnetic powder contained in the lower layer and that contained in the upper layer of 4 or less.

10 Claims, No Drawings

MAGNETIC RECORDING MEDIUM

This is a Continuation of application Ser. No. 07/834,784 filed Feb. 13, 1992, now abandoned.

FIELD OF THE INVENTION

This invention relates to a magnetic recording medium comprising a non-magnetic support having thereon a plurality of magnetic layers comprising an upper layer containing ferromagnetic metal or alloy powder and a lower layer containing cobalt-modified iron oxide. More particularly, it relates to a magnetic recording medium having improved electromagnetic characteristics and running properties.

BACKGROUND OF THE INVENTION

Magnetic recording mediums comprising a non-magnetic support having thereon a magnetic layer containing ferromagnetic iron oxide powder or ferromagnetic metal or alloy powder (hereinafter referred to simply as "ferromagnetic metal") dispersed in a binder are conventionally used as magnetic recording mediums for video, audios and computers.

The high density and long-time recording ability of the magnetic recording mediums have been improved year after year. Higher image quality and higher sound quality are highly demanded, and it is necessary to improve the electromagnetic characteristics. To meet these demands, the output of the magnetic recording mediums must be increased and the noise must be reduced. Further improvement is necessary in hardware, such as the VTR. It is considered that higher output can be obtained by using ferromagnetic metal having a high coercive force and high saturation magnetization ($\sigma s$), increasing a loading density with more finer ferromagnetic powder, or improving the surface properties to reduce spacing loss formed by the magnetic head. Further, it is considered that a thinner magnetic layer or support is needed to cope with long-time recording.

As a method for improving image quality and sound quality, there have been proposed multilayer magnetic recording mediums comprising an upper layer containing ferromagnetic metal and a lower layer containing ferromagnetic iron oxide powder, whereby functions are separated to improve electromagnetic characteristics over a wide range [see, JP-A-54-145104 (the term "JP-A" as used herein means an "unexamined published Japanese patent application"), JP-A-58-56231, JP-A-60-256917 and JP-A-2-110823]. In the method described in JP-A-2-110823, fine ferromagnetic iron oxide particles are used in the lower layer to improve surface properties, thus ultimately improving the electromagnetic characteristics. However, the charging characteristics are poor, and hence the running properties deteriorate.

As a method for obtaining excellent running properties, the magnetic layer generally contains carbon black having an average primary particle diameter of 10 to 150 mµ. In general, when carbon black having a small particle size is used, the deterioration of the surface properties of the resulting magnetic layer is relatively small. Further, use of small carbon black particles result in poor running properties. When carbon black having a large particle size is used, running properties are good, but smoothness is inferior. Hence, the electromagnetic characteristics are lowered. For this reason, attempts have been made to use a combination of carbon black particles having various average primary particle sizes in the magnetic layer when the magnetic layer is composed of a single layer [see, JP-B-54-9041 (the terms "JP-B" as used herein means an "examined Japanese patent publication"), JP-B-53-20203 and JP-A-58-218039]. However, a magnetic recording medium having good running properties, as well as good electromagnetic characteristics, has not be obtained.

In the case of multi-layer magnetic recording mediums comprising two or more magnetic layers, there have been disclosed methods wherein different types of carbon blacks are added to the upper layer and the lower layer as a means for obtaining magnetic recording mediums having excellent running properties, as well as good electromagnetic characteristics (see, JP-A-58-200425, JP-A-63-300425 and JP-A-1-205726). In the specification of JP-A-58-200425, carbon black is contained only in the second magnetic layer (the upper layer) to improve the electromagnetic characteristics. In the specifications of JP-A-63-300425 and JP-A-1-205726, coarse carbon black particles are contained in the second magnetic layer (the upper layer) and fine carbon black particles are contained in the first magnetic layer (the lower layer) to improve the antistatic properties and running properties without lowering the electromagnetic characteristics.

In the system wherein the upper layer contains ferromagnetic metal and the lower layer contains cobalt-modified iron oxide, the charging characteristics are greatly deteriorated. Additionally, the content of the fine carbon black particles to be contained in the lower layer must be high and the electromagnetic characteristics are lowered. Further, when the magnetic layer is made thinner by taking long-term recording into consideration, the surface properties are deteriorated and the electromagnetic characteristics are lowered.

In general, when the coercive force is increased, output in the region of short wavelengths is increased, but output in the region of long wavelengths is lowered. There is proposed the use of a magnetic layer composed of a multi-layer wherein the upper layer contains ferromagnetic metal and the lower layer contains magnetic iron oxide powder. In this system, it is contemplated that output can be improved over a wide range by making the recording of signals in the region of long wavelengths on the lower layer and using ferromagnetic powder having a high coercive force in the upper layer.

In order to obtain good electromagnetic characteristics, it is necessary that the surface properties of the magnetic layer are improved to thereby reduce a spacing loss between the magnetic head and the tape. Particularly, when ferromagnetic metal is used, saturated magnetization is high. As a result, it is difficult for the powder to be dispersed due to the magnetic interaction between magnetic particles. In the absence of high saturated magnetization, or, the particles are apt to agglomerate even when the particles are dispersed. Accordingly, good surface properties can not be obtained. Thus, many dispersion methods, dispersants and binders have been proposed. Further, there have been proposed methods wherein after the magnetic layer is coated and dried, the surface thereof is smoothed by passing it between a metallic roll and a resilient roll or metallic rolls.

It is desirable that the magnetic recording mediums have excellent electromagnetic characteristics as well as excellent running durability. In particular, the smoother the surface of the magnetic layer, the more difficulty there is in imparting excellent running durability. To solve the problem, the magnetic layer is generally composed of carbon black. Alternatively, an abrasive such as corundum, silicon carbide or chromium oxide is added thereto. However, considerable amounts of these powders must be used to obtain the effect of imparting good running durability. By adding considerable amounts of such powders, the loading degree of the ferromagnetic powder is lowered and the surface properties of the magnetic recording mediums are deteriorated. Accordingly, good electromagnetic characteristics can not be obtained.

Further, there have been proposed methods wherein fatty acids, or esters of fatty acids with aliphatic alcohols, are contained as lubricants in the magnetic layer to thereby reduce the coefficient of friction. However, a larger amount of the lubricant must be used to provide a low coefficient of friction on the smooth magnetic layer. The molecular weight of the lubricant is very small in comparison with the binder. Hence, when a large amount of the lubricant is used, the magnetic layer is plasticized, and as a result, still durability is deteriorated.

JP-A-2-206020 discloses a multi-layer structure wherein magnetic iron oxide powder is used in the upper layer as well as in the lower layer. The stearic acid adsorption amount of ferromagnetic powder is specified, and ferromagnetic powder having a lower stearic acid adsorption amount is used in the upper layer. The purpose of the above properties is so that even when the amount of the fatty acid to be added to the magnetic layer is small, the fatty acid exudes on the surface of the tape and functions as a lubricant without being adsorbed by ferromagnetic powder. However, a potential problem has been found in that in the system wherein the upper layer contains metal and the lower layer contains cobalt-modified iron oxide, the magnetic layer has a high coefficient of friction, wherein the coefficient is in the range of the stearic acid adsorption amount described in the specification of JP-A-2-206020. The coefficient of friction is further increased after repeated running.

SUMMARY OF THE INVENTION

An object of the present invention is to provide a magnetic recording medium which has improved electromagnetic characteristics as well as running properties, though the magnetic layers thereof are thin.

Another object of the present invention is to provide a magnetic recording medium comprising a non-magnetic support having thereon a plurality of magnetic layers, consisting of an upper magnetic layer containing ferromagnetic metal and a lower magnetic layer containing cobalt-modified iron oxide and having improved electromagnetic characteristics and running properties.

The above-described objects of the present invention have been achieved by providing:

a magnetic recording medium comprising a non-magnetic support having thereon a plurality of magnetic layers consisting of two or more layers composed of a first lower magnetic layer and a second upper magnetic layer, provided on said support by either co-coating the lower magnetic layer and the upper magnetic layer in the wet state, or coating the lower magnetic layer and then the upper magnetic layer while the lower magnetic layer is still in the wet state; wherein cobalt-modified iron oxide is employed as the ferromagnetic powder contained in the lower magnetic layer, ferromagnetic metal is employed as the ferromagnetic powder contained in the upper magnetic layer; and wherein both the ferromagnetic powder contained in the lower magnetic layer and the ferromagnetic powder contained in the upper magnetic layer have an average major axis length of 0.25 μm or less and an average acicular ratio of 10 or less, a difference in the average major axis length between the ferromagnetic powder contained in the lower magnetic layer and that contained in the upper magnetic layer is 0.08 μm or less, and a difference in the average acicular ratio between the ferromagnetic powder contained in the lower magnetic layer and that contained in the upper magnetic layer is 4 or less;

a magnetic recording medium comprising a non-magnetic support having thereon a plurality of magnetic layers consisting of two or more layers composed of a first lower magnetic layer and a second upper magnetic layer, provided on said support by either co-coating the lower magnetic layer and the upper magnetic layer in the wet state, or coating the lower magnetic layer and then the upper magnetic layer while the lower magnetic layer is still in the wet state; wherein cobalt-modified iron oxide is employed as the ferromagnetic powder contained in the lower magnetic layer, ferromagnetic metal is employed as the ferromagnetic powder contained in the upper magnetic layer; and wherein both the ferromagnetic powder contained in the lower magnetic layer and the ferromagnetic powder contained in the upper magnetic layer have an average major axis length of 0.25 μm or less, the lower magnetic layer contains cobalt-modified iron oxide having a stearic acid adsorption rate of $3 \times 10^{-6}$ to $6 \times 10^{-6}$ mol/m$^2$ as the ferromagnetic powder, the upper magnetic layer contains ferromagnetic metal having a stearic acid adsorption rate of at least $6 \times 10^{-6}$ mol/m$^2$ as the ferromagnetic powder, and the upper magnetic layer contains at least one member of organophosphorus compounds represented by the following general formulas (1), (2) and (3)

$(R-O)_n PO(OM)_{3-n}$     (1)

$(R-O)_n P(OM)_{3-n}$     (2)

$(R)_n PO(OM)_{3-n'}$     (3)

wherein R represents a substituted or unsubstituted alkyl, alkenyl or aryl group, M represents a hydrogen atom, an alkali metal or $-N(R_1)_4$, $R_1$ represents an alkyl group, and n represents 1 or 2; and a magnetic recording medium comprising a non-magnetic support having thereon a plurality of magnetic layers consisting of two or more layers composed of a first lower magnetic layer and a second upper magnetic layer, provided on said support by either co-coating the lower magnetic layer and the upper magnetic layer in the wet state, or coating the lower magnetic layer and then the upper magnetic layer while the lower magnetic layer is still in the wet state; wherein cobalt-modified iron oxide is employed as the ferromagnetic powder contained in the lower magnetic layer, ferromagnetic metal is employed as the ferromagnetic powder contained in the upper magnetic layer; and wherein both the ferromagnetic powder contained in the lower magnetic layer and the ferromagnetic powder contained in the upper magnetic layer have an average major axis length of 0.25 μm or less, the lower magnetic layer contains ferromagnetic powder composed of cobalt-modified iron oxide magnetic powder having a silicon content of 0.2 to 4.0 atom % in terms of Si/Fe, the upper magnetic layer contains ferromagnetic powder composed of ferromagnetic metal having an aluminum content of 5.0 to 15.0 atom % in terms of Al/Fe, and the upper magnetic layer contains at least one member of organophosphorus compounds represented by the following general formulas (1), (2) and (3)

$$(R-O)_nPO(OM)_{3-n} \quad (1)$$

$$(R-O)_nP(OM)_{3-n} \quad (2)$$

$$(R)_nPO(OM)_{3-n'} \quad (3)$$

wherein R represents a substituted or unsubstituted alkyl, alkenyl or aryl group, M represents a hydrogen atom, an alkali metal or $-N(R_1)_4$, $R_1$ represents an alkyl group, and n represents 1 or 2.

DETAILED DESCRIPTION OF THE INVENTION

The major axis length and acicular ratio of the ferromagnetic powder used in the present invention are obtained according to the following measuring methods.

An enlarged (100,000×magnification) photograph of the ferromagnetic powder is taken by using a transmission type electron microscope. 500 particles on the photograph of the ferromagnetic powder are traced one by one using an image analyzer. Each particle is allowed to approximate to a spheroid, and the diameter of the major axis and that of the minor axis are determined. The acicular ratio is calculated by determining the ratio of the diameter of the major axis to the diameter of the minor axis, and calculating the mean value of the two. The average primary particle diameter of the carbon black is determined in the same manner as described above, namely, each particle is allowed to approximate to a circle, and the corresponding diameter is determined. The mean value of the diameters of 500 particles are determined.

An important feature of the present invention is that the ferromagnetic powder contained in the lower layer is cobalt-modified iron oxide, the ferromagnetic powder contained in the upper layer is ferromagnetic metal, and both the ferromagnetic powder contained in the lower layer and the ferromagnetic powder contained in the upper layer have an average major axis length of 0.25 μm or less. Further, the difference in the average major axis length between the ferromagnetic powder contained in the lower layer and that contained in the upper layer is 0.08 μm or less. In addition, both the ferromagnetic powder contained in the lower layer and the ferromagnetic powder contained in the upper layer have an average acicular ratio of 10 or less, and a difference in the average acicular ratio therebetween is 4 or less. The major axis length is shortened, the acicular ratio is lowered and a difference in the major axis length as well as the acicular ratio between the ferromagnetic powder in the lower layer and that in the upper layer is reduced; whereby the orientation of the ferromagnetic powder is slightly inhibited, the lower layer and the upper layer can be co-coated in the wet state, thereby reducing a disorder at the interface between the two layers which is ordinarily caused when orientation at a magnetic field is conducted.

As a result, surface properties after coating can be improved. Further, since the acicular ratio is low, calendering can be improved and surface properties can be improved. Thus, output in the high-pass region as well as in the low-pass region can be improved, and at the same time, S/N in the low-pass region can be improved. Furthermore, since the major axis length of the ferromagnetic powder contained in the upper layer is shortened and the ferromagnetic powder contained in the upper layer is a fine-grained particle, the loading degree of the ferromagnetic powder can be improved, noise due to particles can be reduced, and output in the high-pass region and C/N can be improved. Thus, an increase in output and a reduction in noise from a low-pass region to a high-pass region can be achieved.

As described above, excellent electromagnetic characteristics are obtained according to the magnetic recording medium of the present invention.

Further, it is also required to reduce the surface electric resistance from the standpoint of sliding contact of the tape. As the means for reducing the surface electric resistance, it is known to add fine-grained carbon blacks. However, the addition of such a non-magnetic substance causes the deterioration of surface property and the reduction of degree of loading, and as a result, the electromagnetic characteristics are deteriorated.

In view of the above, a method for obtaining a magnetic recording medium having good electromagnetic characteristics and a low surface electric resistance even with the addition of a non-magnetic substance such as carbon black is desired. Therefore, further investigation has been conducted by the present inventors, and as a result, the present inventors have found that the magnetic recording medium having, in addition to the above-characteristics, the following characteristics that a ratio of $Fe^{2+}/Fe^{3+}$ in the ferromagnetic powder contained in the lower magnetic layer is at least 5 mol %, and the lower magnetic layer contains at least one carbon black having an average primary particle diameter of 20 nm or less in an amount of not more than 7 parts by weight per 100 parts by weight of the ferromagnetic powder can meet the electromagnetic characteristics as well as the surface electric resistance.

In addition, the present inventors paid attention to an interaction between the surface properties of the ferromagnetic powder and a fatty acid as a lubricant to improve the running properties of the magnetic recording medium having a multi-layer structure wherein different materials are laminated onto each other, that is, the upper layer contains ferromagnetic metal and the lower layer contains cobalt-modified iron oxide magnetic powder. As a result, the present invention has been accomplished.

In the case of such a multi-layer structure of this type, short wave signals are received by the upper layer and long wave signals are received by the lower layer. In the present invention, the thickness of the upper layer is preferably 1 μm or less whereas that of the lower layer is preferably 3 μm or less. Therefore, when the interaction between the ferromagnetic powder and the lubricant is taken into consideration, the contribution of the lower layer is larger than that of the upper layer. Hence, the present inventors are the first to determine the type of ferromagnetic powder to be contained in the lower layer.

As a result, it has been found that when the stearic acid adsorption rate of cobalt-modified iron oxide magnetic powder is set to the range defined above, the adsorption of the fatty acid as the lubricant on the cobalt-modified iron oxide magnetic powder can be properly controlled. Further, the initial friction coefficient can be lowered to a functional level. Namely, when the ferromagnetic powder contains silicon, the pH is shifted to the acidic side, the stearic acid adsorption rate is lowered and the fatty acid is allowed to easily exude on the upper layer. Thus, the aforesaid effect can be exhibited. When the stearic acid adsorption rate is larger than the upper limit defined above, the adsorption of the fatty acid as the lubricant on the cobalt-modified iron oxide magnetic powder is increased, the amount of the fatty acid on the surface of the tape is decreased and good running properties can not be obtained. When the stearic acid adsorption rate is less than the lower limit defined above, the polymer used in the dispersion of the magnetic powder is not easily adsorbed, the dispersibility is lowered, and the loading degree of the powder is lowered. Accordingly, output in the low-pass region is lowered, surface properties become poor, and hence output in the high-pass region is lowered.

The initial friction coefficient can be lowered in the manner mentioned above. However, since a coefficient of friction after repeated running is still high, the present inventors have examined the surface properties of the upper layer containing metal. As a result, it has been found that when the stearic acid adsorption rate of the metal contained in the upper layer is set to the range defined above, an increase in the coefficient of friction after repeated running can be inhibited. Specifically, when the ferromagnetic powder contains aluminum, the pH is shifted to the alkaline side, the stearic acid adsorption rate is increased, the stearic acid retentivity is increased, and an increase in a coefficient of friction after repeated running can be inhibited. In this case, however, the dispersibility is lowered, and the electromagnetic characteristics are insufficient. It has been found that the use of the above-described organophosphorus compounds is effective in improving dispersibility.

It is known from JP-A-1-189025 that the above-described organophosphorus compounds are used in magnetic recording mediums comprising a single magnetic layer containing ferromagnetic metal. In the case of a multi-layer structure wherein cobalt-modified iron oxide magnetic powder is contained in the lower layer, however, good electromagnetic characteristics as well as good running properties cannot be obtained when the above-described organophosphorus compounds are used in the upper layer. When the stearic acid adsorption rate of the ferromagnetic metal used in the upper layer is less than the lower limit defined above, the friction coefficient of the upper layer is increased after repeated running as described above. Such an increase in a coefficient of friction causes a problem.

It has been found that when the stearic acid adsorption rates of the magnetic substances used in the lower and upper layers are as stipulated and the organophosphorus compounds are used in the upper layer, good electromagnetic characteristics, as well as good running properties can be obtained. The stearic acid adsorption rate of the ferromagnetic powder used in the present invention is measured in the following manner. The unit thereof is $mol/m^2$.

Five gram of ferromagnetic powder is added to a 100 ml Erlenmeyer flask containing 50 ml of a methyl ethyl ketone solution containing 2 wt % of stearic acid. The flask is stoppered, the mixture is stirred at 25° C. for 25 hours with a magnetic stirrer, and solid-liquid separation is carried out by using a centrifugal separator. The concentration (C) (wt %) of stearic acid in the resulting supernatant liquid is measured by means of gas chromatography. The stearic acid adsorption rate per unit area of ferromagnetic powder is determined using the following formula:

Stearic acid adsorption rate $(mol/m^2)=(1-50\times C)/(5\times SSA\times MA)$ wherein SSA is the specific surface area of ferromagnetic powder, and MA is the molecular weight (284) of stearic acid.

The magnetic recording medium of the present invention comprises basically a non-magnetic support having thereon a multi-layer structural magnetic layer containing ferromagnetic powder.

Examples of the non-magnetic support which can be used in the present invention include films of various synthetic resins, such as polyethylene terephthalate, polypropylene, polyethylene naphthalate, polycarbonates, polyamides, polyimides and polyamideimides, and metallic foils, such as aluminum foil and stainless steel foil. The non-magnetic support has a thickness of generally 2.5 to 100 μm, preferably 3 to 70 μm. The non-magnetic support may be provided with a back layer described hereinafter on the opposite side of the magnetic layer.

The magnetic recording medium of the present invention comprises the above-described non-magnetic support having thereon,a multi-layer structural magnetic layer containing ferromagnetic powder.

The thickness of the lower layer is preferably 3 μm or less. From the standpoint of the long-time recording or reproducing of tape, it is preferred that the magnetic layer thickness is as thin as possible. On the other hand, since the thickness of the lower layer is an important factor in the multi-layer structure as to the productivity, the lower limit of the lower layer thickness is 0.8 μm. The thickness of the upper layer is preferably 1 μm or less, particularly preferably 0.8 μm or less. When the thickness of the upper layer is 1.1 μm or more, the effect of the multi-layer structure cannot be sufficiently displayed. The term "thickness" as used herein means a thickness in the finished magnetic recording medium subjected to drying, calendering, etc.

If desired, a non-magnetic interlayer may be provided between the lower magnetic layer and the upper magnetic layer. Further, an undercoat layer may be provided between the lower magnetic layer and the support. In addition, a thin protective layer may be provided on the upper magnetic layer. All of these options may be used as long as the effect of the present invention can be displayed.

Examples of the ferromagnetic metal which can be used in the upper magnetic layer include ferromagnetic metal or alloy powders which contain at least 75 wt % of a metallic component wherein at least 80 wt % of said metallic component is composed of at least one ferromagnetic metal or alloy (e.g., Fe, Co, Ni, Fe—Co, Fe—Ni, Co—Ni, Co—Ni—Fe) and 20 wt % or less of said metallic component may optionally contain other components (e.g., Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B, P) and iron nitride. It is preferred that those ferromagnetic metals contain Al and/or Si. The above-described metals may contain a small amount of water, a hydroxide or an oxide. The methods for preparing these ferromagnetic metals are known in the art.

Examples of the methods for preparing the ferromagnetic metal include the following methods.

(a) A method wherein a composite organic acid salt (mainly oxalate) is reduced with a reducing gas, such as hydrogen.

(b) A method wherein iron oxide is reduced with a reducing gas, such as hydrogen, to obtain Fe or Fe—Co particles.

(c) A method wherein a metal carbonyl compound is thermally decomposed.

(d) A method wherein a reducing agent, such as sodium boron hydride, a hypophosphite or hydrazine, is added to an aqueous solution of a ferromagnetic metal to carry out reduction.

(e) A method wherein ferromagnetic metal powder is electrolytically precipitated by using a mercury cathode and subsequently separated from mercury.

(f) A method wherein metal is vaporized in a low-pressure inert gas to obtain fine powder.

The ferromagnetic metal may be used in the form of a needle, a granule, a dice-like, an ellipsoidal, a plate or other similar form without particular limitation. When metallic powder obtained by the above methods is brought into contact with air, the metallic powder is easily oxidized, and such oxidation is not preferred. Accordingly, it is desirable that a slow oxidizing method is used wherein a layer of an oxide is formed on the surface of the metallic powder by means of slow oxidation to thereby stabilize the powder. An example of such methods includes a method wherein metallic powder is immersed in an organic solvent in an inert gas and dried in air after the solvent is evaporated. Another example is a method wherein an oxygen gas is gradually introduced into an inert gas to increase the oxygen concentration, and finally the oxygen concentration in the inert gas atmosphere is brought into the same oxygen concentration as that in air.

Ferromagnetic powder contained in the upper layer has a coercive force preferably about 600 to 5,000 Oe, more preferably about 900 to 2,200 Oe, particularly preferably about 1,000 to 2,000 Oe. When the coercive force is about 590 Oe or less, the electromagnetic characteristics in the short wavelength region are lowered. When the coercive force is about 5,010 Oe or greater, recording can not be made by use of a conventional head. It is preferred that the ferromagnetic powder contained in the upper layer has a specific surface area of at least 40 m$^2$/g, particularly 45 to 80 m$^2$/g, as measured by the BET method, an average major axis length of 0.25 µm or less, an acicular ratio of 10 or less and a crystallite size of 15 to 30 nm, particularly 15 to 25 nm. When the physical properties of the ferromagnetic powder are outside of the ranges specified above, noise is increased and C/N is lowered. When the surface area is less than 45 m$^2$/g, the surface of the magnetic tape is not sufficiently smoothed, particle noise is increased and the electromagnetic characteristics are deteriorated. When the surface area is more than 80 m$^2$/g, dispersion becomes difficult to conduct. For the same reason, it is preferred that the average major axis length is 0.25 µm or less and the crystallite size is 25 nm or less. It is preferred that saturation magnetization ($\sigma$s) is high as possible, and is generally in the range of 100 to 160 emu/g. However, saturation magnetization of more than 180 emu/g is not feasible.

It is preferred that an aluminum compound is added to the ferromagnetic powder to alkalize it. For example, aluminum oxide, aluminum chloride or aluminum hydroxide described in JP-A-2-257419 is added.

In another embodiment of the present invention, the stearic acid adsorption rate of the ferromagnetic metal in the upper layer is set to at least $6 \times 10^{-6}$ mol/m$^2$. The upper limit of the stearic acid adsorption rate is preferably $15 \times 10^6$ mol/m$^2$. When the stearic acid adsorption rate is controlled by an after-treatment in an aqueous system, such as the treatment of cobalt-modified iron oxide magnetic powder used in the lower layer, the oxidation and corrosion of the ferromagnetic metal proceed and saturation magnetization is lowered. Thus, such a controlling method is not preferred. It is preferred that a compound of a metal, e.g., Al, which easily forms an alkaline oxide is added during or after the formation of goethite ($\alpha$-FeOOH). The amount of Al to be added is preferably in the ratio of Al to Fe of 5.0 to 15.0 atom %. When the amount of Al is larger than the upper limit defined above, the saturation magnetization is lowered, Bm (i.e., maximum magnetic flux density) in the form of a tape is lowered, and electromagnetic characteristics are lowered. If desired, other elements other than Al, such as Ni, Co, Cr, Si, Zn and Mn, may be added. The surface of the ferromagnetic metal is generally subjected to a slow oxidization treatment to prevent spontaneous combustion in air. When the ferromagnetic metal is slowly oxidized by using an organic solvent in the slow oxidation treatment, a solvent-modified product is formed by catalytic activity on the surface of the metal powder and adsorbed by the surface of the metal. Further, surface properties are shifted to an acidic side. For this reason it is preferred that slow oxidation is carried out by gradually increasing the concentration of an oxidizing gas in an inert gas without using any organic solvent.

The upper layer contains at least one member of organophosphorus compounds represented by the following general formulas (1), (2) and (3).

$$(R\text{—}O)_n PO(OM)_{3-n} \quad (1)$$

$$(R\text{—}O)_n P(OM)_{3-n} \quad (2)$$

$$(R)_n PO(OM)_{3-n} \quad (3)$$

wherein R represents a substituted or unsubstituted alkyl, alkenyl or aryl group, M represents a hydrogen atom, an alkali metal or —N(R$_1$)$_4$, R$_1$ represents an alkyl group, and n represents 1 or 2.

Examples of M include a hydrogen atom, sodium, potassium and tetraethylammonium ion. Examples of R include a straight-chain or branched alkyl group having preferably 1 to 22 carbon atoms such as methyl, ethyl, propyl, butyl, hexyl, heptyl, octyl, nonyl, decyl, dodecyl, tetradecyl and octadecyl; a straight-chain or branched alkenyl group such as vinyl, propenyl, isopropenyl, butenyl, pentenyl, allyl and oleyl group; an aryl group such as phenyl, naphthyl, anthryl, diphenyl, diphenylmethyl, p-ethylphenyl, tolyl and xylyl group; and a substituted alkyl, alkenyl or aryl group having a substituent group other than a hydrocarbon group, such as 2-aminoethyl, 2-butoxyethyl and p-nitrophenyl group. Further, the aryl group may have a ring such as an indene ring or tetraline ring other than a benzene ring.

Examples of the organophosphorus compounds represented by the above-described general formulas include phosphoric acids and monoesters and diesters of phosphoric acid such as $\alpha$-naphthylphosphoric acid, phenylphosphoric acid, diphenylphosphoric acid, n-butyl phosphate, di-n-butyl phosphate, di(2-ethylhexyl) phosphate, isopropyl phosphate and diisopropyl phosphate and salts thereof; monoesters and diesters of phosphorous acid such as di-n-butyl phosphite, diethyl phosphite, dioleyl phosphite and diphenyl phosphite and salts thereof; phosphonic acids such as p-ethylbenzenesulfonic acid and phenyl phosphonic acid and salts thereof; and phosphinic acids such as phenyl phosphinic acid and salts thereof. Among these compounds, organophosphorous compounds having an aryl group are preferred with those having phenyl being particularly preferred. All of the compounds described in JP-A-1-189025 can be used as the organophosphorous compounds of the present invention.

The upper magnetic layer of the present invention contains the above-described organophosphorous compounds in an amount of preferably 0.03 to 10 parts by weight, more preferably 0.05 to 7 parts by weight based on 100 parts by weight of the ferromagnetic metal. When the amount of the organophosphorus compound is less than the lower limit defined above, an effect of adding the organophosphorus compound cannot be obtained. However, when the amount is greater than the upper limit defined above, the dispersion state is deteriorated, free organophosphorus compound is formed and running durability is deteriorated.

Methods for adding the organophosphorus compounds include a method wherein the organophosphorus compound is dissolved or dispersed in a low-boiling organic solvent, the resulting solution is mixed with ferromagnetic powder, and the organic solvent is then removed to prepare a pretreated ferromagnetic powder which is then used for the preparation of the magnetic recording medium. Another method for adding the organophosphorus compounds includes dissolving or dispersing an organophosphorus compound in a part of a solvent for the preparation of a magnetic coating composition and the resulting solution or dispersion is kneaded together with other ingredients in the preparation of a magnetic coating composition.

Examples of Co-modified iron oxide include Co-doped iron oxide, Co-iron oxide solid solution and Co-deposited iron oxide. Examples of iron oxide include $FeO_x$ (preferably $1.33 \leq x \leq 1.48$).

It is preferred that Co-modified iron oxide has a major axis length of 0.25 μm or less, an acicular ratio of 10 or less and a specific surface area of greater than or equal to 35 $m^2/g$ as measured by the BET method. When the surface area is smaller than about 35 $m^2/g$, the loading degree of the magnetic powder is lowered, magnetic flux density is lowered, the electromagnetic characteristics deteriorate and further the ferromagnetic powder can not be sufficiently fine-grained. As a result, the surface of the magnetic tape cannot be sufficiently smoothed. For the same reason, the crystallite size is preferably smaller than 350 Å.

The coercive force of the lower layer is in the range of from 500 to 1500 Oe and preferably 1.1 to 0.4 times, particularly preferably 0.8 to 0.4 times that of the upper layer. When the coercive force of the lower layer is about 1.2 times or more than that of the upper layer, the electromagnetic characteristics in the long wavelength region are poor. Similarly, when the coercive force of the lower layer is about 0.3 times or less that of the upper layer, the electromagnetic characteristics in the short wavelength region are poor. Saturation magnetization (σs) is preferably about 70 to 80.

The stearic acid adsorption rate of cobalt-modified iron oxide used in the lower layer of the present invention is set at from $3 \times 10^6$ to $6 \times 10^{-6}$ $mol/m^2$. The stearic acid adsorption rate can be kept at the range defined above by treating the surface of cobalt-modified iron oxide with a Si, Al, Ca, Sn, Zr or Ti compound. This surface treatment can be carried out, for example, by mixing cobalt-modified iron oxide magnetic powder with water glass in an alkaline solution and heating them. The pH of the alkaline solution is in the range of 8 to 13, preferably 8 to 11. The treating temperature is 40° to 250° C., preferably 50° to 200° C. The treating time is preferably 0.5 to 5 hours. These methods are concretely described in JP-A-2-206020. It is preferred that silicon compounds are used to shift the pH to an acidic side. Examples of silicon compounds include silicic acid and metal salts of silicic acid described in JP-A-2-257419. The amount of silicon to be contained is in the ratio of Si to Fe of 0.2 to 4.0 atom %. The stearic acid adsorption rate can be controlled to the range defined above.

With regard to the carbon black content of each magnetic layer in the present invention, the lower layer contains fine carbon black particles having an average primary particle diameter of 20 nm or less in an amount of 7 parts by weight or less per 100 parts by weight of ferromagnetic powder contained in the lower magnetic layer. When the amount of carbon black exceeds 10 parts by weight, the surface properties of the lower layer and the loading degree of ferromagnetic powder are lowered and the electromagnetic characteristics deteriorate. The upper layer may contain coarse-grained carbon black having an average primary particle diameter of 20 to 150 nm, preferably 40 to 90 nm.

Examples of carbon black having an average primary particle diameter of not larger than 20 nm include Conductex SC (18 nm) (manufactured by Columbia Carbon), and Black Pearls 800 (18 nm), Black pearls 1300 (12 nm) and Dia Black 950B (16 nm) (manufactured by Mitsubishi Carbon). These carbon blacks are commercially available under the above trade names.

Examples of carbon black having an average primary particle diameter of 40 to 90 nm include Asahi #60 and Asahi #50 (50 nm and 80 nm) (manufactured by Asahi Carbon KK), Raven 450 (62 nm) and Raven 410 (70 nm) (manufactured by Columbia Carbon).

Usable carbon blacks are not limited to the above products. Any other carbon blacks can be used, so long as the average primary particle diameter is within the range defined above. Further, mixtures of two or more carbon blacks can be used.

Binders which can be used in the lower and upper magnetic layers and the back layer optionally provided include conventional thermoplastic resins, thermosetting resins, reactive resins and mixtures thereof.

Thermoplastic resins having a softening temperature of not higher than 150° C., an average molecular weight of 10,000 to 300,000 and a degree of polymerization of about 50 to 2,000 can be used. Examples of such thermoplastic resins include vinyl chloride-vinyl acetate copolymers, vinyl chloride copolymers, vinyl chloride-vinylidene chloride copolymers, vinyl chloride-acrylonitrile copolymers, acrylic ester-acrylonitrile copolymers, acrylic ester-vinylidene chloride copolymers, acrylic ester-styrene copolymers, methacrylic ester-acrylonitrile copolymers, methacrylic ester-vinylidene chloride copolymers, methacrylic ester-styrene copolymers, urethane elastomers, nylon-silicone resins, nitrocellulose-polyamide resins, polyvinyl fluoride, vinylidene chloride-acrylonitrile copolymers, butadine acrylonitrile copolymers, polyamide resins, polyvinyl butyrals, cellulose derivatives (e.g., cellulose acetate butyrate, cellulose diacetate, cellulose triacetate, cellulose propionate, nitro-cellulose, ethyl cellulose, methyl cellulose, propyl cellulose, methylethyl cellulose, carboxymethyl cellulose, acetylcellulose), styrene-butadiene copolymers, polyester resins, chlorovinyl ether-acrylic ester copolymers, amino resins, various thermoplastic synthetic rubbers and mixtures thereof.

Thermosetting resins or reactive resins which can be used in the present invention are resins having a molecular weight of 200,000 or less in the state of a magnetic coating composition and a molecular weight approaching infinity through condensation, addition or other reactions which take place when the magnetic coating composition is heated after being applied and dried. Of such resins, preferred are ones which do not soften or melt at temperatures lower than the thermal decomposition point thereof. Examples of such thermosetting or reactive resins include phenolic resins, phenoxy resins, epoxy resins, curable polyurethane resins, urea resins, melamine resins, alkyd resins, silicone resins, reactive acrylic resins, epoxypolyamide resins, nitrocellulose-melamine resins, mixtures of high-molecular polyester resins and isocyanate prepolymers, mixtures of methacrylate copolymers and diisocyanate prepolymers, mixtures of polyesterpolyols and polyisocyanates, urea-formaldehyde resins, mixtures of low-molecular glycols, high-molecular diols and triphenylmethane triisocyanate, polyamine resins, polyimine resins and mixtures thereof.

The binders which can be used in the lower and upper magnetic layers, and the optional back layer, are used in an amount of generally 10 to 40 parts by weight, preferably 15 to 30 parts by weight, based on 100 parts by weight of ferromagnetic powder.

Examples of usable binder resins include cellulose derivatives, vinyl chloride copolymers (e.g., vinyl chloride-vinyl acetate copolymers containing a third component such as vinyl chloride-vinyl acetatemaleic anhydride copolymers and vinyl chloride-vinyl acetate copolymers), vinylidene chloride copolymers, polyester resins, acrylic resins, polyvinyl acetal resins, polyvinyl butyral resins, phenoxy resins, epoxy resins, butane-acrylonitrile copolymers, polyurethane resins and urethane-epoxy resins. These resins may be used either alone or in combination.

It is preferred that these thermoplastic resins and thermosetting or reactive resins have, in addition to main functional groups originally incorporated therein, 1 to 6 functional groups selected from the group consisting of acid groups such as carboxyl, sulfinic acid, sulfenic acid, sulfonic acid, phosphoric acid, sulfuric acid, phosphonic acid, phosphinic acid, boric acid, sulfuric ester, phosphoric ester and alkyl ester thereof (these acid groups may be in the form of a salt such as Na salt); amphoteric groups such as amino acid, aminosulfonic acid, sulfuric or phosphoric ester of aminoalcohol and alkylbetaine type groups; and other groups such as amino, imino, imido, amido, epoxyl, hydroxyl, alkoxyl, thiol, halogen, silyl and siloxane groups. The content of each functional group is $1 \times 10^{-6}$ to $1 \times 10^{-2}$ equivalent per gram of the resin.

Among the above-described resins, the use of a combination of a polyurethane resin with a vinyl chloride resin is preferred. When a polyurethane resin and a vinyl chloride resin are used in combination, it is particularly preferred that at least one of these resins is a resin having a repeating units containing a polar group. Examples of repeating units having a polar group in the vinyl chloride copolymers include those having one or more polar groups of —COOM, —SO$_3$M, —OSO$_3$M and —PO(OM)$_2$ (wherein M is a hydrogen atom or an alkali metal atom). The vinyl chloride copolymers may have one of these repeating units or two or more of them. The vinyl chloride copolymers having a repeating unit containing an —SO$_3$Na group and/or a repeating unit containing a —COOH group are particularly preferred.

The content of the repeating unit having a polar group in the copolymer is generally in the range of 0.001 to 5.0 mol % (preferably 0.05 to 3.0 mol %). When the content of the repeating unit having a polar group is less than 0.001 mol %, the dispersion state of ferromagnetic powder is apt to deteriorate. When the content of the repeating unit is higher than 5.0 mol %, the copolymers become hygroscopic and the weather resistance of the tape is liable to be lowered.

It is preferred that the above-described vinyl chloride copolymers have a repeating unit containing an epoxy group. The epoxy group in the vinyl chloride copolymers mainly functions to stabilize the vinyl chloride copolymers and inhibit the dehydrochlorination reaction of the copolymers which proceeds with time.

When the vinyl chloride copolymers have a repeating unit containing an epoxy group, the content of the repeating unit containing the epoxy group is preferably in the range of 1 to 30 mol %, and the proportion of the repeating unit containing the epoxy group per mol of the vinyl chloride repeating unit which constitutes the vinyl chloride copolymer, is in the range of preferably 0.01 to 0.5 mol, particularly preferably 0.01 to 0.3 mol. Such vinyl chloride copolymers have a number-average molecular weight of generally 10,000 to 100,000, preferably 15,000 to 60,000.

When the polyurethane resins have a repeating unit containing a polar group, examples of the repeating units include those having one or more polar groups of —COOM, —SO$_3$M, —OSO$_3$M and —PO(OM)$_2$, wherein M is a hydrogen atom or an alkali metal atom. The resins may have one of these repeating units or two or more of them. Particularly preferred are polyurethane resins having a repeating unit containing an —SO$_3$Na group and/or a repeating unit containing a —COOH group.

The content of the repeating unit having a polar group in the polyurethane resins is in the range of generally 0.001 to 5.0 mol %, preferably 0.01 to 2.0 mol %. When the content of the repeating unit having a polar group is lower than 0.001 mol %, the dispersion state of the ferromagnetic powder is apt to be lowered. However, when the content is higher than 5.0 mol %, the polyurethane resins become hygroscopic and the weather resistance of the tape is likely to become lower. Such polyurethane resins have a number-average molecular weight of generally 10,000 to 200,000, preferably 15,000 to 60,000.

The ratio of the vinyl chloride resin to the polyurethane resin is preferably 35:65 to 80:20 by weight, particularly preferably 40:60 to 70:30 by weight when they are used in combination as a binder. Further, the binder may be preferably a curable material containing a polyisocyanate compound in addition to the vinyl chloride resin and the polyurethane resin.

Examples of the polyisocyanate compound which can be used in the present invention include isocyanates such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, triphenylmethane triisocyanate and isophorone diisocyanate. Products of the isocyanates with polyalcohols and 2 to 15-mer polyisocyanates resulting from the condensation of the isocyanates can also be used. Polyisocyanates having an average molecular weight of 100 to 20,000 are preferred. Many polyisocyanates are commercially available under trade names of Coronate HL, Coronate 2030, Coronate 2031, Millionate MR and Millionate MTL (manufactured by Nippon Polyurethane Industry Co., Ltd.), Takenate D-102, Takenate D-110N, Takenate D-200, Takenate D-202, Takenate 300S and Takenate 500 (manufactured by Takeda Chemical Industries Ltd.) and Sumidule T-80, Sumidule 44S, Sumidule PF, Sumidule L, Sumidule N, Desmodule L, Desmodule IL, Desmodule HL, Desmodule T65, Desmodule 15, Desmodule R, Desmodule RF, Desmodule SL and Desmodule Z4273 (manufactured by Sumitomo Bayer Co., Ltd.).

These compounds may be used either alone or in a combination of two or more of them by utilizing a difference in curing reactivity. If desired, the polyisocyanates can be used in combination with a compound having a hydroxyl group (e.g., butanediol, hexanediol, polyurethane having a molecular weight of 1,000 to 10,000 and water), an amino group (e.g. monomethylamine, dimethylamine, trimethylamine), or a metal oxide catalyst to accelerate the curing reaction. It is desirable that the compounds having a hydroxyl group or amino group are polyfunctional compounds. These polyisocyanates are used in an amount of 5 to 40 wt % based on the total amount of the binder.

Dispersants, lubricating agents, antioxidants and abrasives (including various types and sizes) described in JP-A-2-110823 can be used in the present invention.

Examples of the lubricating agents which can be used in the magnetic layer of the magnetic recording medium of the present invention include silicone oil, fatty acid-modified silicone oil, graphite, fluorinated alcohols, polyolefins (e.g., polyethylene wax), polyglycols (e.g., polyethylene oxide wax), tetrafluoroethylene oxide wax, polytetrafluoroglycol, perfluorofatty acids, perfluorofatty acid esters, perfluoroalkylsulfuric esters, perfluoroalkylphosphoric esters, alkylphosphoric esters, polyphenyl ether, fatty acids, fatty acid esters, fatty acid amides and aliphatic alcohols. Among these, fatty acids are preferred.

The fatty acids are used in an amount of preferably 0.1 to 5 parts by weight, particularly preferably 0.3 to 4 parts by weight based on 100 parts by weight of the magnetic powder. When the amount of fatty acid to be added is less than the lower limit defined above, the lubricating effect is insufficient, the coefficient of friction is increased and the running of the tape becomes unstable. When the amount is more than the upper limit defined above, the magnetic layer is plasticized and becomes brittle when repeatedly used.

Examples of the fatty acids which can be used in the present invention include capric acid, undecylic acid, lauric acid, myristic acid, palmitic acid, stearic acid, behenic acid, montanic acid, oleic acid, elaidic acid, linolic acid, linoleic acid and stearolic acid.

It is preferred that the fatty acids are used in combination with fatty acid esters. The fatty acid esters are used in an amount of preferably 0.1 to 5 parts by weight, particularly preferably 0.3 to 4 parts by weight based on 100 parts by weight of the magnetic powder. The fatty acid and the fatty acid ester are used in a ratio by weight of preferably 1:9 to 9:1. Examples of the fatty acid esters which can be used in the present invention include butyl myristate, methyl myristate, butyl stearate, ethyl palmitate, butoxyethyl palmitate and butoxyethyl stearate.

It is preferred that the magnetic layer of the magnetic recording medium of the present invention contains inorganic particles having a Mohs hardness of at least 5. Any of the inorganic particles can be used without particular limitation, so long as they have a Mohs hardness of at least 5. Examples of such inorganic particles include $Al_2O_3$ (Mohs hardness: 9), TiO (Mohs hardness: 6), $TiO_2$ (Mohs hardness: 6.5), $SiO_2$ (Mohs hardness: 7), $SnO_2$ (Mohs hardness: 6.5), $Cr_2O_3$ (Mohs hardness: 9) and $\alpha$—$Fe_2O_3$ (Mohs hardness: 5.5). These compounds may be used either alone or as a mixture of two or more of them. Among them, inorganic particles having a Mohs hardness of at least 8 are preferred as they allow for increased running durability. The inorganic particles are used in an amount of preferably 0.1 to 20 parts by weight, particularly preferably 1 to 15 parts by weight, per 100 parts by weight of ferromagnetic powder.

It is preferred that the magnetic layer of the magnetic recording medium of the present invention contains carbon black in addition to the above-described inorganic particles.

The method for preparing the magnetic recording medium of the present invention will be illustrated below.

In the preparation of the magnetic layer of the magnetic recording medium of the present invention, ferromagnetic powder, a binder and optionally an abrasive, carbon black, and a lubricating agent, etc. are kneaded and dispersed in a solvent to prepare a magnetic coating composition. Solvents conventionally used for the preparation of magnetic coating compositions can be used. For example, methyl ethyl ketone, toluene, butyl acetate and cyclohexanone can be used as the solvent.

The kneading dispersion can be conducted by any of the conventional methods for the preparation of magnetic coating compositions without particular limitation. The order of the addition of ingredients can be properly chosen. In the preparation of the magnetic coating composition for the upper layer of the present invention, either magnetic powder treated with the organophosphorus compound or the organophosphorus compound is added during the kneading dispersion, thereby introducing the organophosphorus compound into the upper magnetic layer.

Examples of organic solvents which can be used at an arbitrary ratio in the kneading, dispersion and coating of the present invention include ketones such as acetone, methyl ethyl ketone, methyl isobutyl ketone, cyclohexanone, isophorone and tetrahydrofuran; alcohols such as methanol, ethanol, propanol, butanol, isobutyl alcohol, isopropyl alcohol and methylcyclohexanol; esters such as methyl acetate, ethylacetate, butyl acetate, isobutyl acetate, isopropyl acetate, ethyl lactate and glycol acetate monoethylether; ethers such as diethyl ether, tetrahydrofuran, glycol dimethyl ether, glycol monoethyl ether and dioxane; tars (aromatic hydrocarbons ) such as benzene, toluene, xylene, cresol, chlorobenzene and styrene; chlorinated hydrocarbons such as methylene chloride, ethylene chloride, carbon tetrachloride, chloroform, ethylene chlorohydrin and dichlorobenzene; N,N-dimethylformamide; and hexane.

The method of kneading is not critical and the order of adding ingredients can be properly determined.

In the preparation of the magnetic coating compositions and the coating composition for the back layer, conventional kneaders can be used. Examples of such conventional kneaders include two-roll mill, three-roll mill, ball mill, pebble mill, trommel mill, sand grinder, Szegvari attritor, high-speed impeller, dispersing mill, high-speed stone mill, high-speed impact mill, disper, kneader, high-speed mixer, ribbon blender, cokneader, intensive mixer, tumbler, blender, disperser, homogenizer, single screw extruder, twin screw extruder and ultrasonic dispersing machine. The details of technique concerning kneading and dispersion are described in T. C. Patton, *Paint Flow and Pigment Dispersion* (1964, John Wiley & Sons), S. Tanaka, *Industrial Material* (Kogyo Zairyo), Vol. 25, 37 (1977) and the references cited therein. Two or more of these kneading machines can be properly used in combination to continuously feed and apply the coating compositions. Further, reference is also made to U.S. Pat. Nos. 2,581,414 and 2,855,156. In the present invention, the magnetic coating compositions and the coating composition for the back layer can be prepared by kneading and dispersion according to the methods described in the above literature and the references cited therein.

The magnetic layers can be formed by dissolving a desired composition of the above-described ingredients in an organic solvent, coating the resulting solution on a support and drying. In the case where the magnetic coating medium is used in the form of a tape, the thickness of the support is generally about 2.5 to 100 μm, preferably about 3 to 70 μm. In the case where the product is used in the form of a disk or a card, the thickness of the support is about 0.03 to 10 mm. In the case of a drum, a cylindrical support can be used.

Materials for the support include polyesters such as polyethylene terephthalate and polyethylene naphthalate; polyolefins such as polypropylene and polyethylene; cellulose derivatives such as cellulose triacetate and cellulose diacetate; vinyl resins such as polyvinyl chloride and polyvinylidene chloride; other plastics such as polycarbonates, polyamides and polysulfone; metals such as aluminum and copper; and ceramics such as glass.

Prior to coating with the magnetic coating compositions, these supports may be subjected to a corona discharge treatment, a plasma treatment, an under coating treatment, a heat treatment, a dust removal treatment, a metal deposition treatment or an alkali treatment. These supports are described in, for example, West German Patent 3,338,854A, JP-A-59-116926, U.S. Pat. No. 4,388,868 and *Fiber and Industry* (Sen-i and Kogyo), Vol 31, pp. 50–55 (1975) written by Yukio Mitsuishi.

The magnetic layers and the back layers can be coated on the support by means of air doctor coating, blade coating, air knife coating, squeeze coating, dip coating, reverse roll coating, transfer roll coating, gravure coating, kiss roll coating, cast coating, spray coating, bar coating, spin coating or other coating methods. These coating methods are described in detail in *Coating Kogyo*, pp. 253–277, Published by Asakura Shoten (March 20, 1971). In the present invention, the coating is carried out by a so-called "wet-on-wet coating system" wherein the magnetic coating composition for the lower layer and the magnetic coating composition for the upper layer are coated in a superposed state while the lower magnetic layer coat is still in a wet state.

Examples of devices and methods for coating the magnetic recording mediums having a two layer structure include the following.

(1) The lower layer is first coated by means of any of gravure coating, roller coating, blade coating and extrusion coating devices which are conventionally used in the coating of magnetic coating compositions to form the lower layer. While the lower layer is still in a wet state, the upper layer is coated by means of a pressed support type extrusion coating device described in JP-B-1-46186, JP-A-60-238179 and JP-A-2-265672.

(2) The lower layer and the upper layer are almost simultaneously coated by means of one coating head of a device having two slits through which coating compositions are passed as described in JP-A-63-88080, JP-A-2-17971 and JP-A-2-265672.

(3) The lower layer and the upper layer are almost simultaneously coated by means of an extrusion coating device provided with backup rollers as described in JP-A-2-174965.

It is desirable that shear is applied to the coating compositions within the coating head by the methods described in JP-A-62-95174 and JP-A-1-236968 to prevent the electromagnetic characteristics of the magnetic recording mediums from being lowered by the agglomeration of magnetic particles.

The viscosity of the coating compositions must be in the range of the values described in JP-A-3-8471.

The details of the methods for dispersing the ferromagnetic powder and the binder and the methods for coating the coating composition on the support are described in JP-A-54-46011 and JP-A-54-21805.

The magnetic layer coated on the support in the manner described above is optionally subjected to an orientation treatment to thereby orientate magnetic powder in a desired direction while continuously drying. The conveying speed of the support is generally 10 to 1,000 m/min, and the drying temperature is controlled at from 20° to 130° C.

If necessary, surface smoothing processing is conducted and cutting in a desired form is carried out to prepare the magnetic recording medium of the present invention. In this preparation method, the surface treatment of filler, kneading and dispersion, coating, heat treatment, calendering, radiation irradiation (EB) treatment, surface abrasion treatment, and cutting are preferably continuously carried out.

If desired, these stages can be divided into steps. In these stages, temperature and humidity are controlled. The temperature is 10 to 130° C., and the humidity is 5 to 20 mg/m$^3$ in terms of water content in air.

The magnetic recording medium of the present invention has a basic structure where an upper magnetic layer is provided on a lower magnetic layer. If desired, another magnetic layer or a non-magnetic layer may be provided between the lower magnetic layer and the upper magnetic layer, so long as the effect of the present invention is not compromised. Further, a non-magnetic layer may be provided between the lower magnetic layer and the non-magnetic support. Furthermore, each of the lower magnetic layer and the upper magnetic layer may be composed of a plurality of magnetic layers, but the upper magnetic layer of the present invention is basically the uppermost magnetic layer. In addition, other layers such as a protective layer may be provided, so long as the effect of the present invention is not damaged.

The present invention is further illustrated in greater detail with reference to the following examples. It is to be noted that the components, proportions, order of operations, and so on can be changed within the scope of the present invention. Further, it should be noted that the following examples should not be construed to be limiting the scope of the present invention. In the Examples, all parts are by weight.

EXAMPLE 1

| Coating composition A (for lower layer) | |
|---|---|
| Co-γ-FeOx (coercive force = 800 Oe, major axis length, acicular ratio and the ratio of Fe$^{2+}$/Fe$^{3+}$ being indicated in Table 1) | 100 parts |
| Vinyl chloride copolymer (MR-110, manufactured by Nippon Zeon Co., Ltd.) | 15 parts |
| Polyester polyurethane (UR-5500, manufactured by Toyobo Co., Ltd.) | 5 parts |
| Polyisocyanate (Coronate L, manufactured by Nippon Polyurethane Co. Ltd.) | 6.7 parts |
| Myristic acid (commercial) | 2 parts |
| Butyl stearate (commercial) | 1 part |
| Carbon black (average particle size and content being indicated in Table 1) | see Table 1 |
| Methyl ethyl ketone | 350 parts |
| Cyclohexanone | 150 parts |
| Coating composition (for upper layer) | |
| Ferromagnetic metal powder (Ni/Fe = 6 atom %, Al/Fe = 7 atom %, coercive force = 1600 Oe, major axis length and acicular ratio being indicated in Table 1) | 100 parts |
| Vinyl chloride copolymer (MR-110, manufactured by Nippon Zeon Co., Ltd.) | 15 parts |
| Polyester polyurethane (UR-5500, manufactured by Toyobo Co., Ltd.) | 5 parts |
| Polyisocyanate (Coronate L, manufactured by Nippon Polyurethane Co. Ltd.) | 6.7 parts |
| Myristic acid (commercial) | 2 parts |
| Butyl stearate (commercial) | 1 part |
| α-Alumina (particle size: 0.1 μm) | 5 parts |
| Carbon black (average particle size: 80 mμ) | 1 part |
| Methyl ethyl ketone | 350 parts |
| Cyclohexanone | 150 parts |

The above ingredients were thoroughly mixed and dispersed to prepare each of the magnetic coating compositions. The resulting magnetic coating compositions were coated on a polyethylene terephthalate support of 7 μm in thickness in such an amount as to give a 0.5 μm-thick upper film and a 2.3 μm-thick lower film after surface smoothing. The coated product was dried, subjected to surface smoothing treatment and then slitted into specimens of 8 mm in width. Thus, samples 1 to 17 were obtained.

kHz) and a low-pass filter (500 kHzAM). Chroma S/N was represented by a relative value when the value of the above SHG 8 mm tape is referred to as 0 dB.

EV-S900, manufactured by Sony Corporation, was used for the measurements of the above items (2) to (5).

The measured results for Examples and Comparative Examples are shown in Table 1.

TABLE 1

| | Lower magnetic layer | | | | Upper magnetic layer | | Tape characteristics | | | | |
|---|---|---|---|---|---|---|---|---|---|---|---|
| | magnetic powder | | | carbon black | | | high-pass characteristics | | low-pass characteristics | | charging characteristics surface |
| No. | major axis length P1 (μm) | acicular ratio (—) | $Fe^{2+}/Fe^{3+}$ (%) | primary particle size (mμ) | content (parts by weight) | major axis length P2 (μ) | acicular ratio (—) | 7 MHz OUT (dB) | 7 MHz C/N (dB) | chroma output (dB) | chroma S/N (dB) | electric resistance (Ω) |
| 1 | 0.18 | 6.0 | 7 | 16 | 5 | 0.16 | 6.9 | 3.7 | 3.0 | 3.3 | 1.2 | $3.5 \times 10^9$ |
| 2 | 0.18 | 6.0 | 7 | 16 | 5 | 0.21 | 6.9 | 3.5 | 2.8 | 3.1 | 1.1 | $3.0 \times 10^9$ |
| 3 | 0.18 | 6.0 | 7 | 16 | 5 | 0.25 | 6.9 | 3.3 | 2.6 | 2.9 | 1.0 | $2.6 \times 10^9$ |
| 4 | 0.18 | 6.0 | 7 | 16 | 5 | 0.21 | 12.0 | 2.5 | 1.8 | 2.8 | 0.1 | $3.1 \times 10^9$ |
| 5 | 0.18 | 6.0 | 7 | 16 | 5 | 0.29 | 6.9 | 2.7 | 2.0 | 2.6 | 0.1 | $2.2 \times 10^9$ |
| 6 | 0.16 | 6.0 | 7 | 16 | 5 | 0.16 | 6.9 | 3.9 | 3.2 | 3.2 | 1.4 | $3.8 \times 10^9$ |
| 7 | 0.24 | 6.0 | 7 | 16 | 5 | 0.16 | 6.9 | 3.7 | 3.0 | 2.8 | 1.2 | $2.9 \times 10^9$ |
| 8 | 0.27 | 7.0 | 7 | 16 | 5 | 0.16 | 6.9 | 3.5 | 2.8 | 2.5 | 0.0 | $2.4 \times 10^9$ |
| 9 | 0.22 | 12.0 | 7 | 16 | 5 | 0.16 | 6.9 | 3.0 | 2.1 | 2.4 | −0.1 | $2.7 \times 10^9$ |
| 10 | 0.18 | 6.0 | 4 | 16 | 5 | 0.16 | 6.9 | 3.6 | 3.0 | 3.1 | 1.0 | $2.3 \times 10^{10}$ |
| 11 | 0.18 | 6.0 | 4 | 16 | 10 | 0.16 | 6.9 | 3.1 | 2.4 | 2.3 | 0.3 | $3.5 \times 10^9$ |
| 12 | 0.18 | 6.0 | 7 | 16 | 3 | 0.16 | 6.9 | 3.7 | 3.0 | 3.1 | 1.3 | $8.2 \times 10^9$ |
| 13 | 0.18 | 6.0 | 7 | 16 | 10 | 0.16 | 6.9 | 3.0 | 2.3 | 2.4 | 0.1 | $7.0 \times 10^8$ |
| 14 | 0.18 | 6.0 | 7 | 28 | 5 | 0.16 | 6.9 | 2.8 | 2.0 | 2.1 | 0.5 | $1.8 \times 10^{10}$ |
| 15 | 0.18 | 6.0 | 10 | 16 | 3 | 0.16 | 6.9 | 3.5 | 2.9 | 3.2 | 1.2 | $1.8 \times 10^9$ |
| 16 | 0.18 | 6.0 | 10 | 16 | 5 | 0.16 | 6.9 | 3.3 | 2.7 | 3.0 | 1.1 | $8.9 \times 10^8$ |
| 17 | 0.18 | 6.0 | 10 | 16 | 10 | 0.16 | 6.9 | 2.9 | 2.3 | 2.4 | 0.1 | $1.4 \times 10^8$ |

Examples: 3, 6, 7, 10, 12, 15, 16
Comp. Ex.: 4, 5, 8, 9

The samples 1 to 17 were tested to measure the following characteristics.
(1) Surface electric resistance Surface electric resistance was measured by a digital surface electric resistance measuring meter (TR-611A, manufactured by Takeda Riken KK). The measuring conditions were such that temperature and humidity were 23° C. and 30% RH and sample size was 8 mm×8 mm. The measurement was made according to JIS X6101 (1980).
(2) 7 MHz output The output level of a recording frequency of 7 MHz was represented by a relative value when the output level of SHG 8 mm tape (manufactured by Fuji Photo Film Co., Ltd.) is referred to as 0 dB.
(3) 7 MHz C/N The ratio of output at a recording frequency of 7 MHz to noise level at 6 MHz was represented by a relative value when the output level of the above SHG 8 mm tape is referred to as 0 dB.
(4) Chroma output When video signals of color monochromatic signals are recorded by reference image transcription current, the reproducing output was represented by a relative value when the output level of the above SHG 8 mm tape is referred to as 0 dB.
(5) Chroma S/N Measurement was made by using a noise meter (925R, manufactured by Shibasoku Co., Ltd.), a high-pass filter (10

It is clear from the above Table that in the samples of the present invention, output is high in the high-pass region as well as in the low-pass region, noise is reduced, C/N and S/N are high, and the samples of the present invention have excellent electromagnetic characteristics. With regard to chargeability, when the resistance exceeds about $10^{10}$ Ω, the charged potential of the tape in the running system is suddenly increased, tension becomes unstable and a problem in running occurs. When the content of carbon black in the lower layer is increased, such a problem can be partly solved, but the electromagnetic characteristics are deteriorated. When the ratio of $Fe^2/Fe^{3+}$ in the Co-modified iron oxide contained in the lower layer is increased, the surface electric resistance can be lowered and the electromagnetic characteristics can be enhanced, even when the amount of carbon black is small. According to the present invention, there can be obtained tapes which satisfy surface electric resistance characteristics and have excellent running properties as well as electromagnetic characteristics.

As stated above, the present invention provides a magnetic recording medium comprising a non-magnetic support having thereon a plurality of magnetic layers consisting of two or more layers composed of a first lower layer and a second upper layer provided on said non-magnetic support, wherein ferromagnetic metal contained in the upper magnetic layer and Co-modified iron oxide contained in the lower magnetic layer have an average major axis length of 0.25 μm or less and an average acicular ratio of 10 or less, a difference in the average major axis length between ferromagnetic metal in the upper layer and Co-modified iron oxide in the lower layer of 0.08 μm or less and a difference in the average acicular ratio therebetween of 4 or less. In this manner, there can be obtained a magnetic recording medium which has high output in the high-pass region as well as in the low-pass region, enables noise to be reduced, has high C/N and S/N and is excellent in surface electric resistance characteristics, as well as in running properties.

EXAMPLE 2 AND COMPARATIVE EXAMPLES 1 TO 5

Preparation of surface-treated Co-modified iron oxide magnetic powder 500 g of needle Co-modified iron oxide magnetic powder (Co—$FeO_x$: x=1.45, coercive force=800 Oe, specific surface area=48 $m^2$/g, crystallite size=25 nm, average major axis length=0.15 μm) was added to 5 l of an aqueous sodium hydroxide solution adjusted to a pH of 9, and dispersed therein in a homomixer to prepare a slurry of Co-modified iron oxide magnetic powder. To the slurry, there was added the entire amount of a solution of water-soluble water-glass in 0.2 l of pure water, said water-glass in terms of Si being used in an amount of 1.5 atom % based on the amount of Fe in the Co-modified iron oxide magnetic powder. Subsequently, carbon dioxide gas was passed through the slurry to lower the pH of the slurry to 7.0, and the slurry was filtered. The resulting product was dried at 40° C. to obtain a surface-treated Co-modified iron oxide magnetic powder (magnetic powder B).

In the same manner as described above, magnetic powder A and magnetic powder C were obtained by changing the amount of Si.

The Si/Fe amounts of these magnetic powders and the measured results of stearic acid adsorption rate are shown in Table 2.

TABLE 2

| No. | Si/Fe (atom %) | Stearic acid adsorption rate (mol/$m^2$) |
| --- | --- | --- |
| Magnetic powder A | 5.5 | $1.0 \times 10^{-6}$ |
| Magnetic powder B | 1.5 | $4.0 \times 10^{-6}$ |
| Magnetic powder C | 0.1 | $8.0 \times 10^{-6}$ |

| Preparation of magnetic coating compositions F-1 to F-3 (for lower layer) | |
| --- | --- |
| The above magnetic powder A | 100 parts |
| Vinyl chloride copolymer (MR-110, manufactured by Nippon Zeon Co., Ltd.) | 15 parts |
| Polyester polyurethane (UR-8600, manufactured by Toyobo Co., Ltd.) | 5 parts |
| Polyisocyanate (Coronate L, manufactured by Nippon Polyurethane Co. Ltd.) | 6.7 parts |
| Stearic acid (for industrial use) | 2 parts |
| Butyl stearate (for industrial use) | 1 part |
| Methyl ethyl ketone | 350 parts |
| Cyclohexanone | 150 parts |

Of the above compositions, all of the ingredients except polyisocyanate and stearic acid were dispersed in a sand grinder for 3 hours. Thereafter, polyisocyanate and stearic acid were added thereto, and dispersion was carried out for 15 minutes. The resulting dispersion was filtered through a filter containing pores having an average pore size of 1 μm to obtain magnetic coating composition, F-1.

In the same manner as described above, a magnetic coating composition F-2 was prepared by using magnetic powder B, and a magnetic coating composition F-3 was prepared by using magnetic powder C.

Preparation of ferromagnetic metal powder (D)

500 g of α-FeOOH (Ni/Fe=3 atom %, specific surface area=86 $m^2$/g, average major axis length=0.23 μm) was added to 5 l of pure water and dispersed therein in a homomixer to prepare a slurry of α-FeOOH. To the slurry, there was added the entire amount of a solution of water-soluble water-glass dissolved in 0.5 l of pure water, said water-glass in terms of Si being used in an amount of 10.0 atom % based on the amount of Fe in α-FeOOH. Carbon dioxide gas was passed through the slurry to adjust the pH of the slurry to 7.0, and the slurry was stirred at 30° C. for 30 minutes. The slurry was filtered, and the product was washed with water and dried to obtain a Si-containing α-FeOOH powder.

The Si-containing α-FeOOH was dehydrated by heating it in a nitrogen stream at 500° C. for one hour, and then reduced in a hydrogen stream at 490° C. for 6 hours. After reduction, the container was purged with nitrogen gas. After cooling to room temperature, oxygen gas was gradually introduced into the nitrogen gas to increase the oxygen concentration, and the oxygen concentration in the nitrogen gas atmosphere was brought into the same oxygen concentration as that in air over a period of 6 hours to thereby obtain a Si and Ni-containing ferromagnetic metal powder mainly composed of Fe. The resulting ferromagnetic metal powder had the following properties: the saturation magnetization was 124 emu/g, the coercive force was 1600 Oe, the specific surface area was 59 $m^2$/g, the crystallite size was 19 nm, the average major axis length was 0.17 μm, and the stearic acid adsorption rate was $4.0 \times 10^{-6}$ mol/$m^2$.

Preparation of ferromagnetic metal powder (E)

500 g of α-FeOOH (Ni/Fe =3 atom %, specific surface area=86 $m^2$/g, average major axis length=0.23 μm) was added to 5 l of pure water and dispersed therein in a homomixer to prepare a slurry of α-FeOOH. To the slurry, there was added the entire amount of an aqueous solution of aluminum sulfate (Al content 10.0 atom % based on the amount of Fe in α-FeOOH) dissolved in 0.5 l of pure water.

An aqueous solution of sodium hydroxide was added to the slurry to adjust the pH of the slurry to 9.0. The slurry was stirred at 30° C. for 30 minutes and filtered. The product was washed with water and dried to obtain an Al-containing α-FeOOH powder.

The Al-containing α-FeOOH was dehydrated by heating it in a nitrogen stream at 500° C. for one hour, and then reduced in a hydrogen gas stream at 490° C. for 6 hours. After reduction, the container was purged with nitrogen gas. After cooling to room temperature, oxygen gas was gradually introduced into the nitrogen gas to increase the oxygen concentration. The oxygen concentration in the nitrogen gas atmosphere was brought into the same oxygen concentration as that in air over a period of 6 hours to thereby obtain an Al and Ni-containing ferromagnetic metal powder mainly composed of Fe.

The resulting ferromagnetic metal powder had the following properties: the saturation magnetization was 122 emu/g, the coercive force was 1570 Oe, the specific surface area was 55 $m^2$/g, the crystallite size was 20.5 nm, the average major axis length was 0.15 μm, and the stearic acid adsorption rate was $8.0 \times 10^{-6}$ mol/$m^2$.

| Preparation of magnetic coating compositions G-1 to G-4 (for upper layer) | |
| --- | --- |
| Magnetic metal powder D or E | 100 parts |
| Phenylphosphonic acid | 2 parts |
| Vinyl chloride copolymer (MR-110, manufactured by Nippon Zeon Co., Ltd.) | 15 parts |
| Polyester polyurethane (UR-8600, manufactured by Toyobo Co., Ltd.) | 5 parts |
| Polyisocyanate (Coronate L, manufactured by Nippon Polyurethane Co. Ltd.) | 6.7 parts |
| Stearic acid (for industrial use) | 2 parts |
| Butyl stearate (for industrial use) | 1 part |
| α-Alumina (average particle size: 0.2 μm) | 5 parts |
| Carbon (oil adsorption: 63 ml/g, average particle size: 80 mμ) | 1 part |
| Methyl ethyl ketone | 350 parts |
| Cyclohexanone | 150 parts |

Of the above compositions, all of the ingredients except polyisocyanate and stearic acid were dispersed in a sand grinder for 3 hours. Polyisocyanate and stearic acid were then added thereto and dispersed for 15 minutes. The resulting dispersion was filtered through a filter containing pores having an average pore size of 1 μm to obtain a magnetic coating composition, G-4.

In the same manner as described above, magnetic coating compositions G-1 to G-3 were prepared. The ferromagnetic powders (magnetic substances) used and the amount of phenylphosphonic acid added are shown in Table 3.

TABLE 3

| Magnetic coating composition | Magnetic substance | Stearic acid adsorption rate of magnetic substance used (mol/m$^2$) | Amount of phenylphosphonic acid added |
| --- | --- | --- | --- |
| G-1 | D | $4.0 \times 10^{-6}$ | omitted |
| G-2 | D | $4.0 \times 10^{-6}$ | 2 parts |
| G-3 | E | $8.0 \times 10^{-6}$ | omitted |
| G-4 | E | $8.0 \times 10^{-6}$ | 2 parts |

In Table 3, the amount of phenylphosphonic acid added is represented by weight based on 100 parts of ferromagnetic powder.

The stearic acid adsorption rate of the ferromagnetic powder in Table 2 and Table 3 was measured in the following manner. The unit thereof is mol/m$^2$.

Five g of ferromagnetic powder was added to a 100 ml Erlenmeyer flask containing 50 ml of a methyl ethyl ketone solution containing 2 wt % of stearic acid. The flask was stoppered, and the mixture was stirred with a magnetic stirrer at 25° C. for 25 hours. Solid-liquid separation was carried out by using a centrifugal separator. The concentration (C) (wt %) of stearic acid in the resulting supernatant liquid was measured by means of gas chromatography. The stearic acid adsorption rate per unit area of ferromagnetic powder was determined from the following formula:

$$\text{Stearic acid adsorption rate (mol/m}^2\text{)} = (1 - 50 \times C)/(5 \times SSA \times MA)$$

wherein SSA is the specific surface area of the ferromagnetic powder, and MA is the molecular weight (284) of stearic acid. The resulting magnetic coating compositions were co-coated on a polyethylene terephthalate support of 10 μm in thickness in such an amount as to give a 0.5 μm-thick dry upper layer and a 3.0 μm-thick dry lower layer. The co-coating was carried out at a coating speed of 100 m/min by using an extrusion type coating head having two slits per one head in the wet state. The coated product was subjected to magnetic field orientation and then dried. Subsequently, the coated product was subjected to a surface smoothing treatment and then slitted into specimens of 8 mm in width. Thus, samples (Example 2 and Comparative Examples 1 to 5) were obtained. These samples were tested to measure the following properties. The results are shown in Table 4.

(1) Surface glossiness

The glossiness of the surface of the magnetic layer was measured at an angle of incidence of 45 degrees and at an angle of reflection of 45 degrees by using a standard glossmeter (manufactured by Suga Shikenki KK). The value in Table 4 is represented by the relative value when the glossiness of the sample of Comparative Example 1 is referred to as 100%.

(2) Coefficient of friction

There is measured a tension ($T_2$) required for running a video tape at a speed of 14 mm/sec under a load ($T_1$) of 20 g while the tape is brought into contact with a stainless steel ball (SUS 420 J, surface roughness: 0.1s, 5 mm φ). A coefficient of friction (μ) was calculated by the following formula.

$$\mu = 1/\pi \cdot \ln(T_2/T_1)$$

The measurement was made under such environmental conditions that the temperature was 23° C. and the relative humidity was 70%. A coefficient of friction in the 100th running pass was measured under the same conditions by using a tape after 99 running passes on a video deck.

(3) Y output

Video signals of 50% white were recorded by a reference image transcription current, and the mean value of the envelope of the reproducing output thereof was measured by an oscilloscope.

(4) C output

Video signals of color signals were recorded by a reference image transcription current, and reproducing output was measured in the same manner as described above.

(5) Y-S/N

Noise level was measured by using a noise meter (925R, manufactured by Shibasoku Co., Ltd.), a high-pass filter (10 kHz) and a low-pass filter (4.2 MHz), whereby the S/N ratio was determined.

(6) C-S/N

Noise level was measured by using a noise meter (925R, manufactured by Shibasoku Co., Ltd.), a high-pass filter (10 kHz), and a low-pass filter (500 kHz AM), whereby the S/N ratio was determined.

EV-S900 manufactured by Sony corporation was used for the measurements of the above items (3) to (6). The value was represented by the relative value when the sample of Comparative Example 1 is referred to as 0 dB.

TABLE 4

| Example No. | Coating composition for upper layer | Coating composition for lower layer | Glossiness | Coefficient of friction | | Y output (dB) | C output (dB) | Y-S/N (dB) | C-S/N (dB) |
| --- | --- | --- | --- | --- | --- | --- | --- | --- | --- |
| | | | | one pass | 100 passes | | | | |
| Ex. 2 | G-4 | F-2 | 120 | 0.23 | 0.24 | 1.7 | 1.6 | 1.0 | 0.8 |
| Comp. Ex. 1 | G-4 | F-3 | 100 | 0.21 | 0.24 | 0.0 | 0.0 | 0.0 | 0.0 |
| Comp. Ex. 2 | G-4 | F-1 | 115 | 0.37 | 0.42 | 0.8 | 1.0 | 0.4 | 0.3 |
| Comp. Ex. 3 | G-1 | F-2 | 127 | 0.22 | 0.63 | 1.9 | 1.4 | 0.9 | 0.6 |
| Comp. Ex. 4 | G-2 | F-2 | 92 | 0.17 | 0.59 | −0.7 | 1.0 | −0.5 | −0.3 |
| Comp. Ex. 5 | G-3 | F-2 | 105 | 0.31 | 0.33 | 0.7 | 1.5 | 0.4 | 0.1 |

It is clear from Table 4 that the magnetic recording medium of the present invention has a stably low coefficient of friction in the initial running as well as after repeated running and is excellent in electromagnetic characteristics.

In the present invention, particular attention is paid to the interaction between the surface properties of the ferromagnetic powder and the fatty acid as the lubricant, with regard to the running properties of the magnetic recording medium having a laminated layer structure composed of different materials, wherein the upper layer contains metal or alloy powder and the lower layer contains Co-modified iron oxide powder. When the stearic acid adsorption rate of cobalt-modified iron oxide magnetic powder used in the lower layer is set to the range stated above, the adsorption of the fatty acid as the lubricant on cobalt-modified iron oxide magnetic powder can be properly controlled, and an initial coefficient of friction can be lowered to a level free of adverse affects.

Further, it has been found that an increase in the coefficient of friction after repeated running can be inhibited when the stearic acid adsorption rate of the ferromagnetic metal used in the upper layer is set to the range defined above. Furthermore, it has been found that good electromagnetic characteristics as well as good running properties can be obtained when the above-described organophosphorus compound is used in the upper layer.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic support having thereon a first lower magnetic layer and a second upper magnetic layer, provided on said support by either co-coating the lower magnetic layer and the upper magnetic layer in the wet state, or coating the lower magnetic layer and then the upper magnetic layer while the lower magnetic layer is still in the wet state; wherein a cobalt-modified iron oxide is employed as a ferromagnetic powder contained in the lower magnetic layer, a ferromagnetic metal is employed as a ferromagnetic powder contained in the upper magnetic layer, both the ferromagnetic powder contained in the lower magnetic layer and the ferromagnetic powder contained in the upper magnetic layer having an average major axis length of not larger than 0.25 μm and an average acicular ratio of not larger than 10, a difference in the average major axis length between the ferromagnetic powder contained in the lower magnetic layer and that contained in the upper magnetic layer of not larger than 0.08 μm, and a difference in the average acicular ratio between the ferromagnetic powder contained in the lower layer and that contained in the upper layer of not larger than 4.

2. The magnetic recording medium of claim 1, wherein the ferromagnetic powder contained in the lower magnetic layer has a ratio of $Fe^{2+}/Fe^{3+}$ of at least 5%, and the lower magnetic layer contains at least one member of carbon blacks having an average primary particle diameter of not larger than 20 nm in an amount of not more than 7 parts by weight per 100 parts by weight of the ferromagnetic powder.

3. The magnetic recording medium of claim 1, wherein said lower magnetic layer has a thickness of not larger than 3 μm, and said upper magnetic layer has a thickness of not larger than 0.8 μm.

4. A magnetic recording medium comprising a non-magnetic support having thereon a first lower magnetic layer and a second upper magnetic layer, provided on said support by either co-coating the lower magnetic layer and the upper magnetic layer in the wet state, or coating the lower magnetic layer and then the upper magnetic layer while the lower magnetic layer is still in the wet state; wherein a cobalt-modified iron oxide is employed as a ferromagnetic powder contained in the lower magnetic layer, a ferromagnetic metal is employed as a ferromagnetic powder contained in the upper magnetic layer, both the ferromagnetic powder contained in the lower magnetic layer and the ferromagnetic powder contained in the upper magnetic layer having an average major axis length of not larger than 0.25 μm, the lower magnetic layer containing cobalt-modified iron oxide employed as the ferromagnetic powder having a stearic acid adsorption rate of $2 \times 10^{-6}$ to $6 \times 10^{-6}$ mol/m$^2$ and a silicon content of 0.2 to 4.0 atom % in terms of Si/Fe, the upper magnetic layer containing ferromagnetic metal or alloy powder employed as the ferromagnetic powder having a stearic acid adsorption rate of at least $6 \times 10^{-6}$ mol/m$^{-2}$ and an aluminum content of 5.0 to 15.0 atom % in terms of Al/Fe, and the upper magnetic layer containing at least one organophosphorus compound selected from the group consisting of compounds represented by the following general formulas (1), (2) and (3)

$$(R-O)_n PO(OM)_{3-n} \qquad (1)$$

$$(R-O)_n P(OM)_{3-n} \qquad (2)$$

$$(R)_n PO(OM)_{3-n} \qquad (3)$$

wherein R represents an unsubstituted alkyl, alkenyl or aryl group, or R represents a substituted alkyl, alkenyl or aryl group, the substituent being selected from the group consisting of a 2-aminoethyl group, a 2-butoxyethyl group and a nitrophenyl group, M represents a hydrogen atom, an alkali metal or $-N(R_1)_4$, $R^1$ represents an alkyl group, and n represents 1 or 2.

5. The magnetic recording medium of claim 1, wherein the upper magnetic layer has a coercive force of the ferromagnetic metal or alloy powder contained in the upper magnetic layer of about 600 and 5,000 Oe.

6. The magnetic recording medium of claim 1, wherein the upper magnetic layer has a coercive force of the ferromagnetic metal or alloy powder contained in the upper magnetic layer of about 1,000 to 2,000 Oe.

7. The magnetic recording medium of claim 4, wherein the upper magnetic layer contains organophosphorus compounds in an amount of 0.03 to 10 parts by weight, based upon 100 parts by weight of the ferromagnetic metal.

8. The magnetic recording medium of claim 4, wherein the upper magnetic layer contains organophosphorus compounds in an amount of 0.05 to 7 parts by weight, based upon 100 parts by weight of the ferromagnetic metal.

9. The magnetic recording medium of claim 4, wherein the stearic acid adsorption rate of the ferromagnetic powder in the upper magnetic layer is in the range of $6 \times 10^{-6}$ to $15 \times 10^{-6}$ mol/m$^2$.

10. The magnetic recording medium of claim 4, wherein R is an unsubstituted alkyl, alkenyl or aryl group.

* * * * *